D. HORNER.
Seed-Planter.
No. 8,264.
Patented July 29, 1851
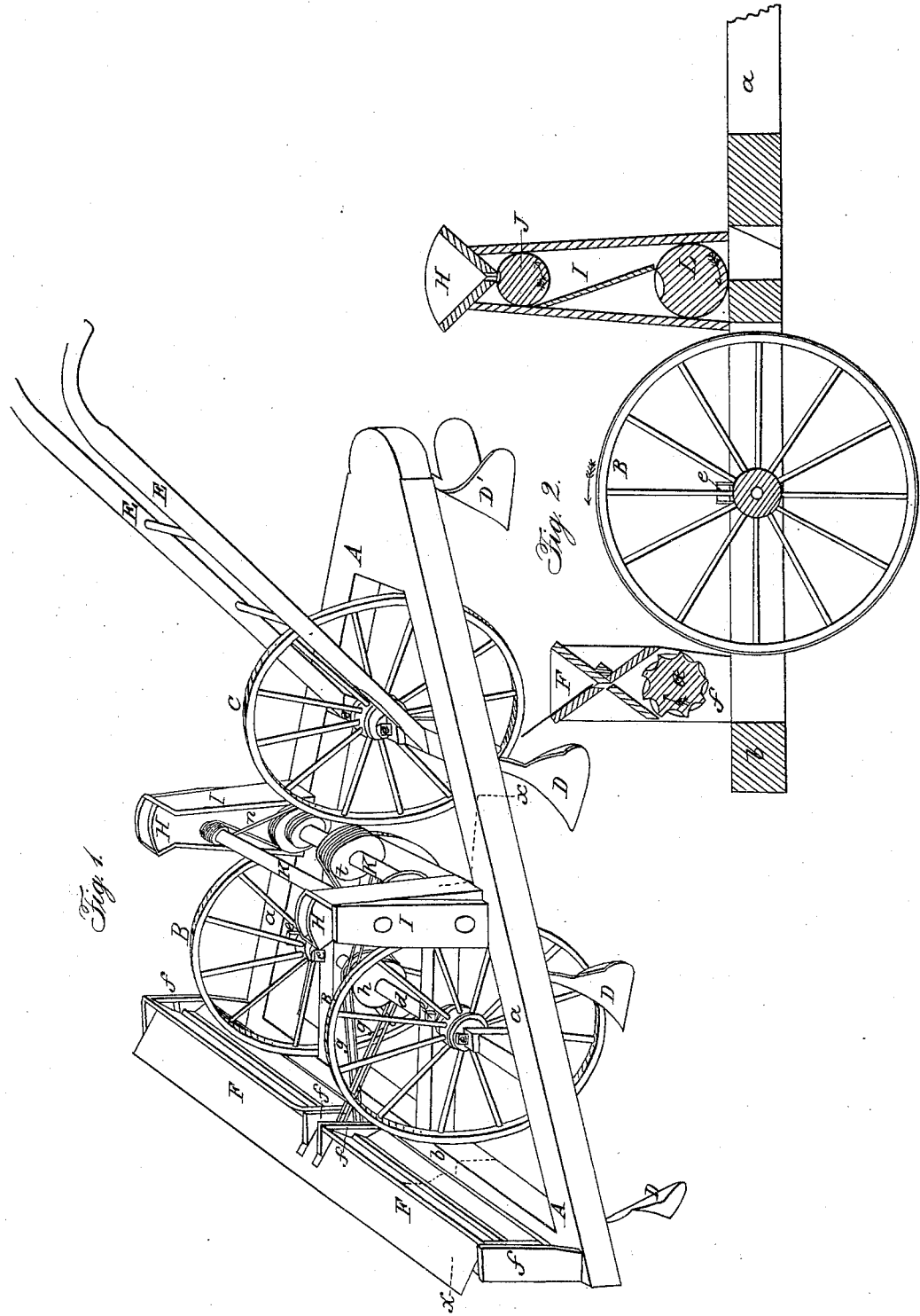

UNITED STATES PATENT OFFICE.

DAVID HORNER, OF KNOX COUNTY, OHIO.

IMPROVEMENT IN SEEDING APPARATUS OF A SEED-PLANTER.

Specification forming part of Letters Patent No. 8,264, dated July 29, 1851.

*To all whom it may concern:*

Be it known that I, DAVID HORNER, of the county of Knox and State of Ohio, have invented certain new and useful Improvements in Seed-Planters, of which the following is a full, clear, and exact description, reference being had to the accompanying drawings, which form part of this specification, and in which—

Figure 1 is a view in perspective of my improved seed-planter, and Fig. 2 is a vertical longitudinal section of the same at the line $x$ $x$ of Fig. 1.

My improvements have reference to two objects—first, to the equable distribution of manure, and, second, to the certain and equable distribution of seed.

In the accompanying drawings, A is the frame of my machine. It is of triangular form, and is constructed of three rails, $a\ a\ b$, suitably framed together and connected by cross-ties. The frame is mounted upon three running wheels, B B C, the front pair, B B, of which are secured to an axle, $d$, whose journals are supported in boxes $e$, which can be moved up or down, to set the frame at a greater or less distance from the ground. The axle-journals of the hinder wheel run also in similar boxes, $e'$. The lower face of the triangular frame is fitted with a series of shares, D D', arranged in the form of a triangle, of which the hindermost one, D', is the apex. A pair of handles may be projected backward from its hindermost cross-tie, and the front cross-bar, $b$, of the frame may be fitted with a forked draft-rod, to which the team may be hitched. The frame thus constructed is furnished with four hoppers. Two of these, F F, are mounted immediately behind the front cross-bar, $b$, and extend its entire length. They are of the form shown in section at Fig. 2, their hinder side being movable, to allow it to be drawn upward or shoved down to open or close the orifice between its lower edge and that of the front side. These hoppers are for the reception of manure, which is evenly distributed by means of fluted rollers G beneath, whose flutes extend in a helical direction round their barrels. One of these rollers is situated beneath each hopper, its journals being supported in the hopper-standards $f$. Their inner journals are prolonged beyond the faces of the standards, and are each fitted with a belt-pulley, which is put in motion by means of a belt or cord, $g$, running upon a similar pulley, $h$, on the axle of the front pair of running wheels, B B, so that as the latter turn in passing over the ground the fluted rollers G are turned in a corresponding manner, to distribute the manure falling from the hopper above in an equable manner throughout the breadth of the machine. The hinder pair of hoppers, H H, are each mounted upon a case, I, in which the seeding-rollers are contained. There are two of these in each case, the office of the upper being to supply seed to the lower, which in turn drops it at suitable intervals to the ground. The upper J is of small diameter, and has a cup-shaped socket formed in its barrel, which, at every revolution of the roller, receives a charge of seed from the hopper and discharges it to the lower roller. Its axle $k$ is fitted with a belt-pulley, $i$, and a corresponding larger pulley is secured to the axle K of the larger roller beneath. The two are encircled by a belt, $n$, so that as the lower is revolved the upper is caused to revolve at a faster speed. The lower roller, L, has also a cup-shaped cavity formed in its barrel of sufficient size to contain the seed discharged by several revolutions of the upper roller, J. Its axle is fitted with a pulley, to which motion is imparted by means of a belt, $l$, from a corresponding pulley on the axle of the driving-wheels. In the machine represented the several belts are crossed, so that the several rollers revolve in the direction indicated by the arrows in the drawings. The upper roller is for the purpose of gaging out the quantity of seed, and the lower roller regulates its deposit at the proper intervals. As the machine is drawn forward over the ground, the upper roller, being driven much faster than the lower, discharges a number of separate measures of seed, whose quantity depends upon the size of the seed-cavity and the number of revolutions it makes for each one of the larger roller beneath. Thus, if the pulleys be of such size that the upper roller makes four revolutions for one of the lower, four measures of seed will be discharged into the roller-case, which, as the lower roller revolves, will be received into the seed-cavity in its barrel and will be dropped simultaneously to the ground in one hill. If a larger quantity of seed is to be deposited at a time, the pulleys are so proportioned that the upper roller shall be revolved with greater relative speed, and if a smaller quantity is required the upper roller is revolved with less speed. These changes of speed may be conveniently effected by shifting the belt $n$ to pulleys of different size, several of which should be secured to each roller-axle. This system also renders the deposit of seed more certain, for if, by any accidental obstruction, the filling of the seed-cavity of the upper roller were prevented for one revolution of this roller, the deposit of only a portion of the whole quantity of seed to be dropped at a time would be prevented, whereas if the same roller that measures out the seed also deposited it, such a stoppage would prevent any portion of the seed from being deposited, and thus a hill would be missed. The upper roller, therefore, effects the double purpose of measuring out the quantity of seed and of rendering its deposit more certain.

The forward pair of manure-hoppers, F F, by distributing manure broadcast, effect a very important purpose when combined with the action of the seed-hoppers behind. In seed-planting machines as ordinarily constructed the manure is either deposited in a mass with the seed or close beside it. In either case the young germ, meeting with rich food, pushes out its shoots with a rapid and unnatural growth; but as its roots extend the sustenance supplied, and consequently the stimulation of the plant, becomes less and less, finally ceasing as the roots grow beyond the small space through which the manure acts; hence the young plant which has grown in the outset with vigor under the stimulating action of the manure, and has pushed out shoots corresponding to the superabundant supply of nutriment it at first received, now languishes upon the ordinary sustenance afforded by the unmanured soil, and its growth is stunted. My machine is intended to obviate this defect by distributing concentrated and other manures broadcast over the ground while the seed is deposited at intervals, so that as the young plants grow their roots continually meet with fresh but moderate supplies of sustenance from the manure, and their growth being correspondingly regular, strong and healthy plants are produced.

What I claim as my invention, and desire to secure by Letters Patent, is—

The combination of the measuring seed-roller with the distributing seed-roller, the two being arranged and operated in the man- and for the purpose herein described.

In testimony whereof I have hereunto subscribed my name.

DAVID HORNER.

Witnesses:
ANDREW KELLY,
JAMES BARRON.